United States Patent

[11] 3,592,515

| [72] | Inventor | John C. Grant<br>Huntington Park, Calif. |
|---|---|---|
| [21] | Appl. No. | 860,288 |
| [22] | Filed | Sept. 23, 1969 |
| [45] | Patented | July 13, 1971 |
| [73] | Assignee | Byron Jackson Inc.<br>Long Beach, Calif. |

[54] PIPE COLLAR WITH POLYGONAL-TYPE INSERT
11 Claims, 10 Drawing Figs.

[52] U.S. Cl............................................ 308/4 A,
175/325
[51] Int. Cl......................................... F16c 17/00
[50] Field of Search............................ 308/4, 4 A;
138/178, 110, 96, 173; 175/325, 323; 166/241,
173, 176; 287/108; 285/424, 373, 419, 420, 52.04,
52.06

[56] References Cited
UNITED STATES PATENTS
3,051,532 8/1962 Collett.................... 308/4 A
3,094,360 5/1963 Collett.................... 308/4 A
FOREIGN PATENTS
548,820 11/1957 Canada.................... 287/52.06

Primary Examiner—Martin P. Schwadron
Assistant Examiner—R. H. Lazarus
Attorneys—Donald W. Banner, William S. McCurry and John W. Butcher ABSTRACT: A generally cylindrical collar or protector adapted to be clamped onto a drill pipe, and having adhesively bonded and embedded in the elastomeric body of the protector a generally cylindrical spring insert band with substantially polygonal wall portions which are pliant, so that when the protector is constricted and secured onto the pipe, flexing of the pliable wall portions and displacement of the elastomeric material between the band and the pipe allow the collar to adapt or conform to the pipe of varying diameters.

PATENTED JUL 13 1971

INVENTOR
JOHN C. GRANT
BY John O. Evans, Jr.
ATTORNEY

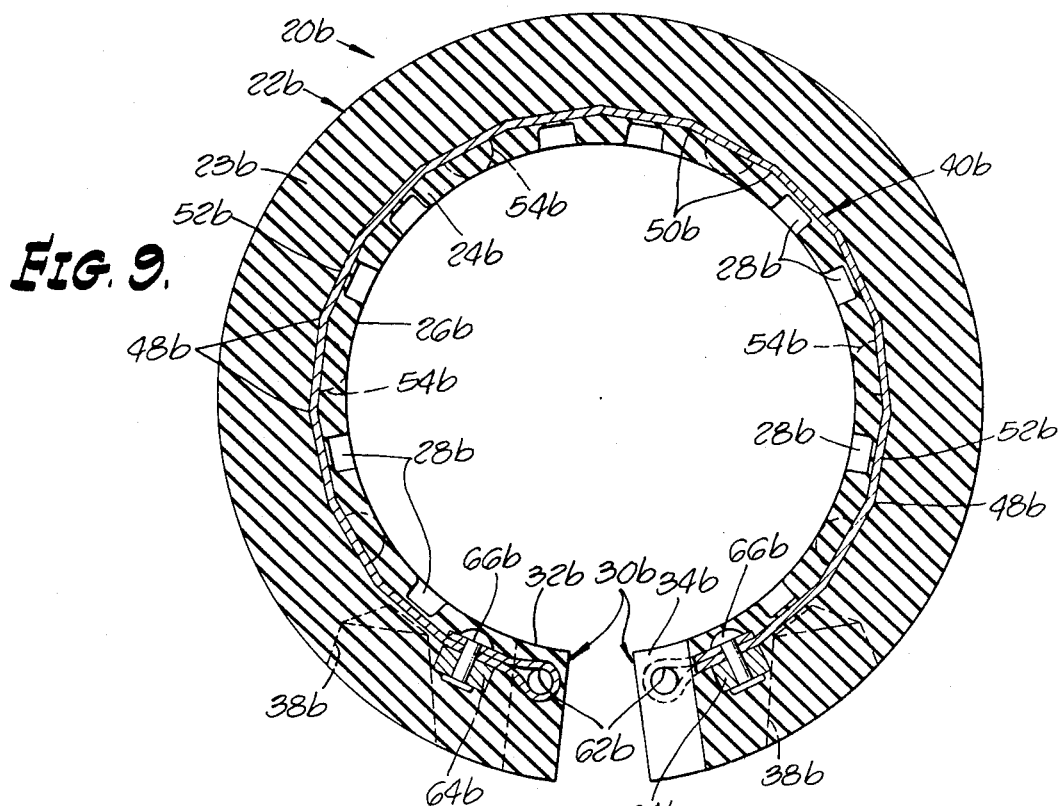
FIG. 9.
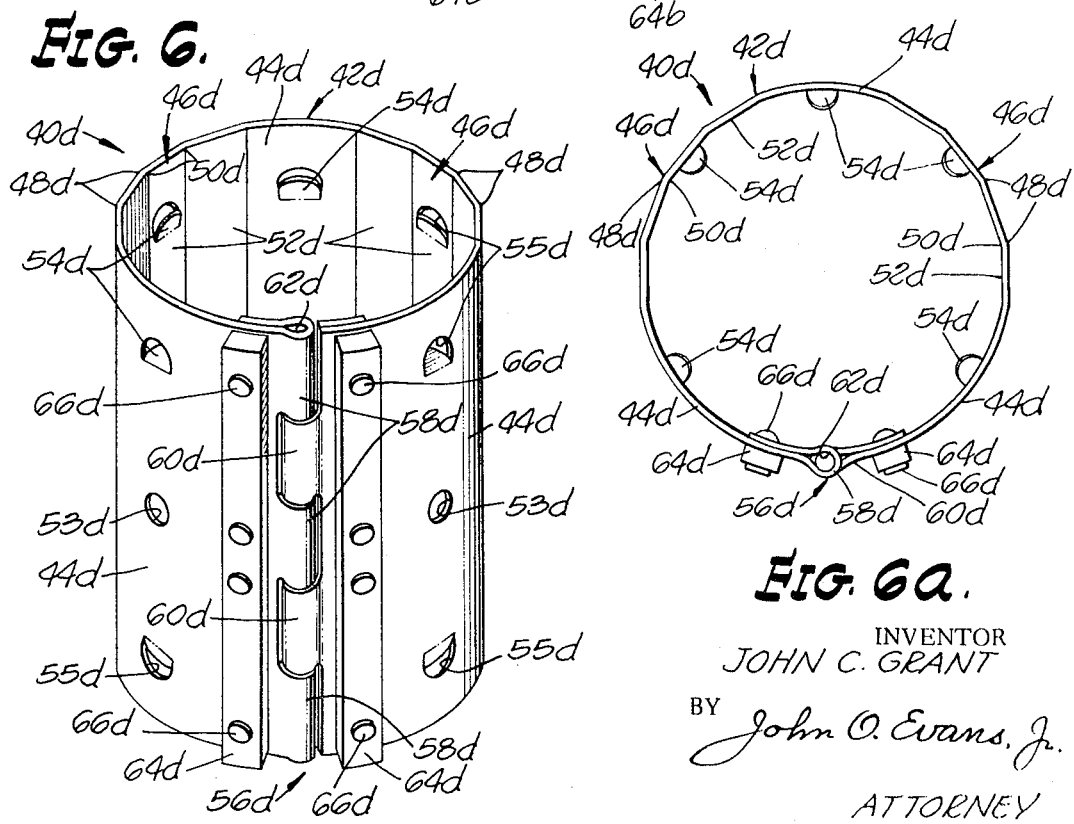
FIG. 6.
FIG. 6A.
INVENTOR
JOHN C. GRANT
BY John O. Evans, Jr.
ATTORNEY INVENTOR
JOHN C. GRANT
BY John O. Evans, Jr.
ATTORNEY

PIPE COLLAR WITH POLYGONAL-TYPE INSERT

BACKGROUND OF THE INVENTION

1. Field of the Invention

This invention relates to drill pipe and casing protectors of the split or latch-on type which may be laterally opened to encircle a pipe, constricted by means of a constricting tool, and then secured to the pipe by means of a lockpin or other latch means so as to serve as protective bearings as the pipe is rotated inside the casing of a well bore in the rotary method of drilling wells.

2. Description of the Prior Art

Extant in the prior art are split-type casing protectors which may be laterally installed onto the pipe, the protector sleeve including a longitudinal slit or opening on one side and with a cylindrical metal reinforcing sleeve or insert embedded and bonded in the elastomeric protector, the lateral ends of the insert adjacent to the protector slit providing means for constricting the protector and locking it in place about the pipe. Examples of the prior art are disclosed in U.S. Pat. Nos. 2,789,870 issued Apr. 23, 1957 to J. W. E. Hanes; 2,959,453 issued Nov. 8, 1960 to H. C. Jacobs; 3,019,063 issued Jan. 30, 1962 to C. H. Collett; and 3,051,532 issued Aug. 28, 1962 to C. H. Collett. The primary deficiencies of latch-on protectors of the prior art have been that the inserts of certain of them have had no provision for flexibility to accommodate or conform to pipe of varying diameters; and where the inserts have provided for expansion the expansion was not limited or controlled, resulting in looseness and slippage on the pipe, particularly when the latter is worn or undersize.

SUMMARY OF THE INVENTION

In order to alleviate the shortcomings encountered heretofore in split or latch-on-type drill pipe collars or protectors, therefore, it is a primary object of this invention to provide a split protector conformable to pipe diameters in the range of acceptable manufacturing tolerances, and to worn or encrusted pipe.

Another object of the invention is to provide a protector capable of constriction without the exertion of excessive force and without overstressing the metal and elastomeric components.

An additional object of this invention is to provide a pipe collar which is adaptable so as to exert substantially a uniform constricting grip on pipe which is undersize, nominal size or oversize.

A further object of the invention is to provide a protector with a pliant reinforcing band adapted to flex on constriction, with movement of adjacent rubber portions, so that the rubber is displaced to relieve the stresses induced by the constriction.

Still another object of this invention is to provide a protector with a metal reinforcing and supporting insert for a latch-on-type drill pipe protector which adapts or conforms to pipe of varying diameters and exerts a substantially uniformly distributed force against the pipe for the most favorable gripping properties.

Briefly, the invention resides in a pipe collar having a lateral opening and adapted to encompass a pipe for securement thereon and including: a substantially cylindrical body comprising elastomeric material; a spring band substantially coextensive with the body and embedded therein, with a continuous layer of the elastomeric material between the band and the inner peripheral portion of the body; and the band having a latch for locking the collar under tension about a pipe; and the band including longitudinal flat sides defining substantially a polygonic cylindric portion, the angular portions of the spring band intermediate the sides being deformable by radial inward movement so as to extend the band when the collar is stretched for securement about a pipe having a diameter larger than the inside diameter of the collar.

BRIEF DESCRIPTION OF THE DRAWINGS

FIG. 6 is a perspective view of an additional form of spring insert band;

FIG. 6a is an end view of the insert band of FIG. 6;

FIG. 9 is a cross-sectional view of a collar similar to that of FIG. 7 and on the same scale, but showing the insert band embodiment of FIG. 4 embedded therein.

DESCRIPTION OF THE PREFERRED EMBODIMENTS

Figure 1:
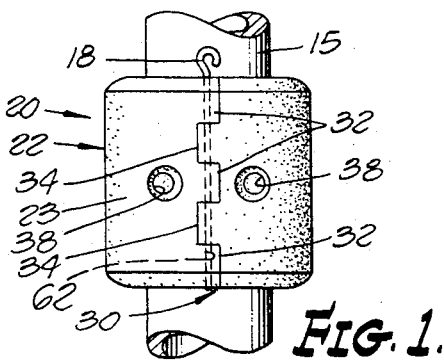
FIG. 1 is a view in elevation of a pipe collar in accordance with the invention shown installed on a pipe.

In FIG. 1 is shown an expansible pipe collar or protector 20 which has been constricted about a length of drill pipe 15 by means of a constricting tool (not shown), which engages the outer portion 23 of the protector body 22 through the constricting tool holes 38 to close the lateral opening 30 of the collar 20 by interengaging the three fingers 32 with the two fingers 34 so that the latch pin 18 may be inserted through the aligned hole 62 of the intermeshed fingers 32, 34.

Figure 2:
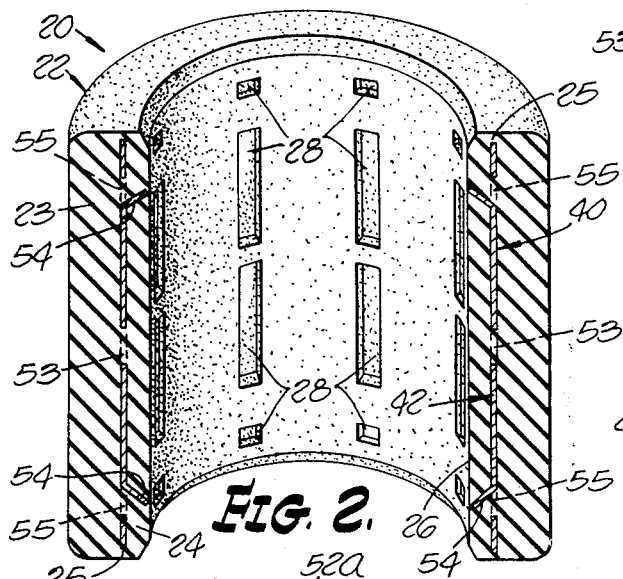
FIG. 2 is a longitudinal sectional view in perspective of the collar on an enlarged scale taken on a plane passing through its axis and substantially 90° from its lateral opening.

FIG. 2 shows the spring insert band 40 embedded in the elastomeric body 22 of the collar 20 so that there is an outer annular portion 23 extending radially outward from the insert 40 and an inner annular portion 24 extending radially inward from the insert 40 to the inner periphery 26 of the protector collar 20, the two portions 23, 24 being connected around the ends of the band 40 by the elastomeric end portions 25 and through the flow holes 53 and pierced openings 55. Longitudinal relief grooves 28 extend radially from the inner periphery 26 outward toward the insert 40. The insert body 42 has prongs 54 extending inwardly to the inner periphery 26 of the collar 20 at each of the pierced openings 55.

Figure 3:
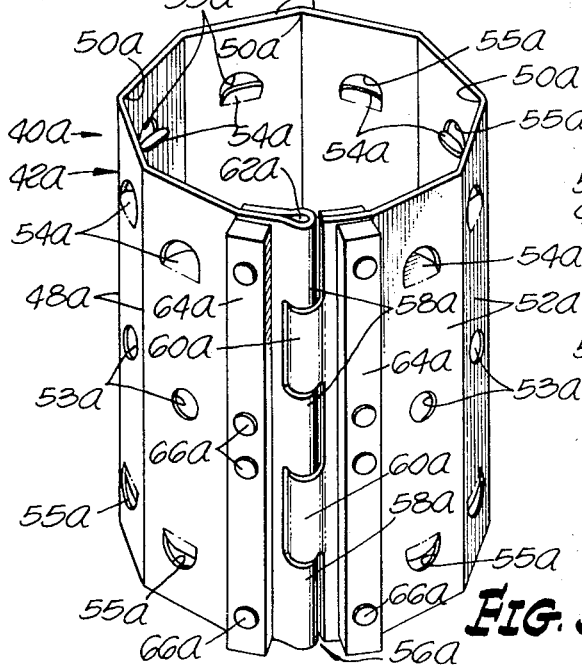
FIG. 3 is a perspective view of one form of spring insert band.

In FIG. 3 is shown one form of spring insert band 40a of substantially nonagonal or nine-sided cylindric configuration, the body portion 42a having eight lateral flat sides or faces 52a substantially equidistant from and parallel to the axis of the band, and convergent in substantially equilateral angular portions 48a, with a radius 50a at the convergences, and the latch 56a substantially defining the ninth side. Extending through the body 42a intermediate its ends is a series of flowholes 53a, and adjacent to its ends two rows of pierced openings 55a, providing two rows of prongs 54a directed angularly inward from the sides 52a. The latch 56a is formed of looped-back ends of the band 40a, one end terminating in three loops 58a and the other end in two loops 60a to provide an aligned pin-receiving hole 62a when the loops 58a, 60a are intermeshed. The loops 58a, 60a are secured by means of rivets 66a extending through each of the loops and a reinforcing bar 64a.

Figure 4:
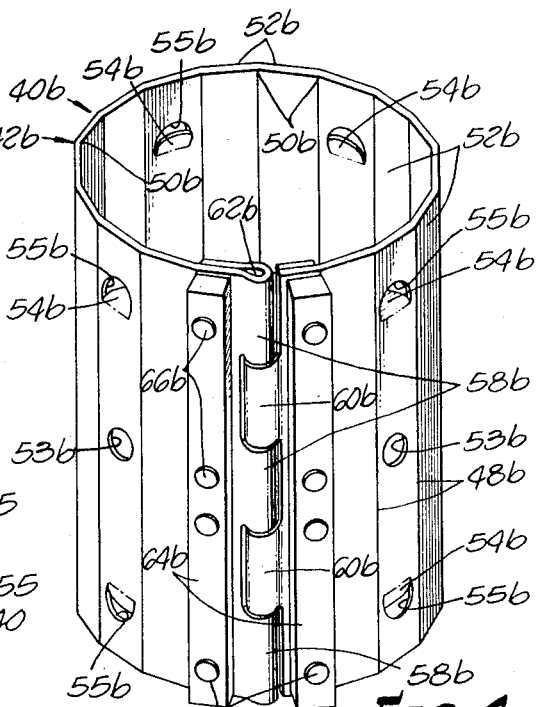
FIG. 4 is a perspective view of another form of spring insert band.

In FIG. 4 is shown another form of spring insert band 40b, the respective components being designated by the same reference numerals as those of FIG. 3, but using the suffix letter b. The spring insert band 40b is substantially an octadecagonic or 18-sided cylindric configuration, the body portion 42b having 16 lateral flat sides or faces 52b substantially equidistant from and parallel to the axis of the band, and the two ends or half-portions of the latch 56b substantially defining the 17th and 18th sides.

Figure 5:
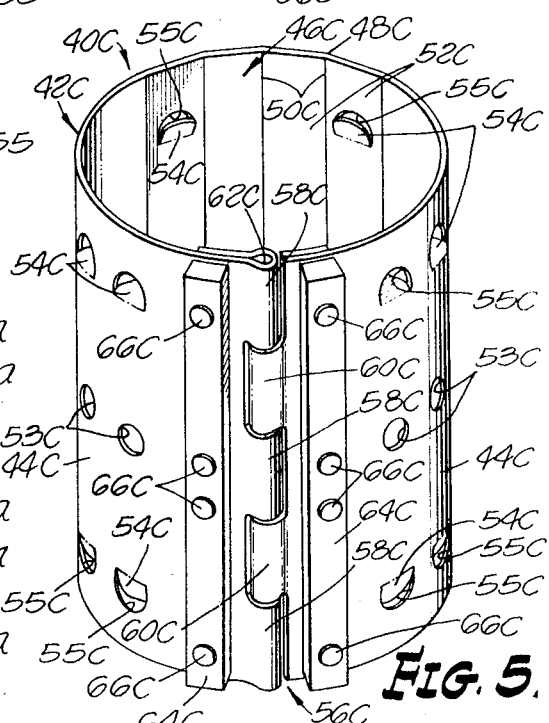
FIG. 5 is a perspective view of still another form of spring insert band.

In FIG. 5 is shown a third form of spring insert 40c, the respective components being designated by the same reference numerals as those of FIGS. 3 and 4, but using the suffix letter c. The body portion 42c includes a polygonal cylindric portion 46c positioned substantially opposite the latch 56c and having four flat sides 52c, with two circular cylindrical portions 44c of the body 42c between the polygonic cylindric portion 46c and the latch 56c at either side thereof. (The number of faces 52c may be more or less than the four shown.)

In FIGS. 6 and 6a is shown a fourth form of spring insert band 40d, the respective components being designated by the same reference numerals as those of FIGS. 3, 4, and 5, but using the suffix letter d. The body portion 42d includes two polygonal cylindric portions 46d each having four flat faces 52d and positioned substantially 120° from the latch 56d at either side thereof, with three circular cylindrical portions 44d of the body 42d positioned, one between the two polygonal cylindric portions 46d and the other two between the portions 46d and the latch 56d. (The number of faces 52d may be more or less than the four shown.)

Figure 7:
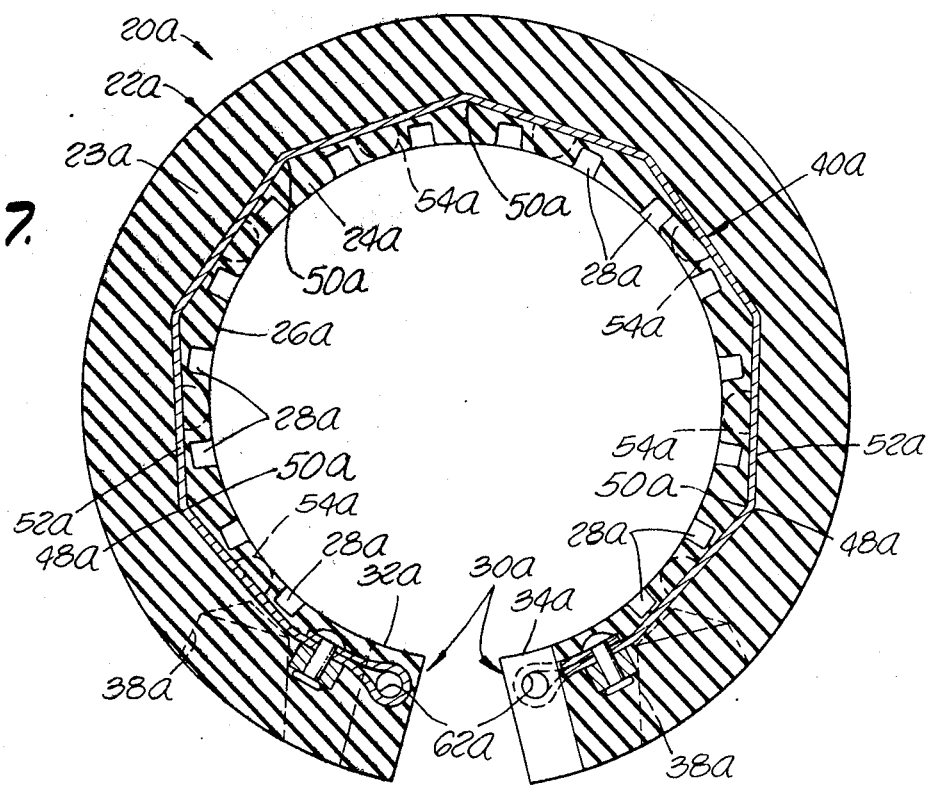
FIG. 7 is a cross-sectional view of the collar on an enlarged scale taken on a plane perpendicular to its axis showing the insert band as embodied in FIG. 3, the collar being in its normal position with its lateral opening ajar.

FIG. 7 shows one form of pipe collar 20a exemplary of the preferred embodiment of the invention in the uninstalled configuration with its lateral opening 30a ajar. The collar 20a includes the form of spring insert band 40a as described above in reference to FIG. 3, the band 40a being embedded so that there is an inner annular sleeve 24a of elastomeric material adjacent to the inner periphery 26a of the protector 20a and an outer annular sleeve 23a comprising the outer portion of the body 22a. The longitudinal relief grooves 28a extend radially outward from the inner periphery 26a into the inner annular elastomeric portion 24a; and the prongs 54a extend inwardly from the sides 52a to the inner periphery 26a of the protector 20a.

Figure 8:
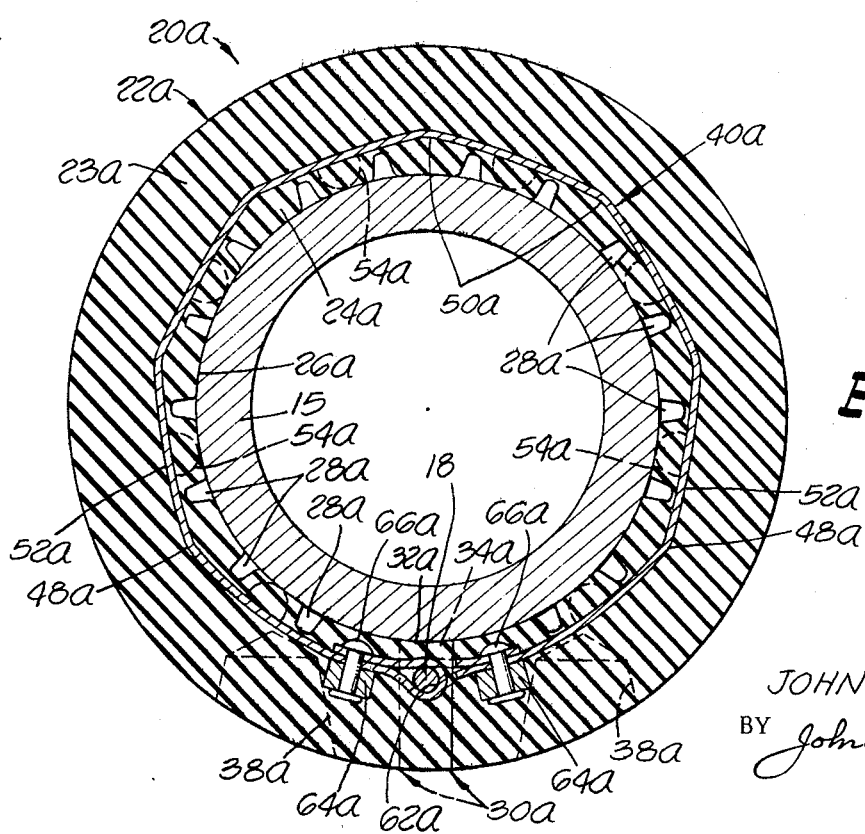
FIG. 8 is a cross-sectional view of the collar of FIG. 7 secured about a pipe.

Referring to FIG. 8, the pipe collar or protector 20a is shown expanded and secured to the pipe 15 with its inner periphery 26a and the inner edges of the prongs 54a in engagement with the pipe, its lateral opening 30a being closed by interengagement of the three fingers 32a with the two fingers 34a to align the pin hole 62a to receive the latch pin 18.

In FIG. 9 is shown another form of pipe collar 20b exemplary of the invention in its uninstalled configuration with the lateral opening 30b ajar. The collar 20b includes the form of spring insert band 40b as described above in reference to FIG. 4. The respective components of the collar 20b are designated by the same reference numerals as those of the embodiment of FIG. 7 described hereinabove, but followed by the suffix letter b.

In a typical operation using a drill pipe collar or protector 20a as depicted in FIGS. 7 and 8, a rubber material to form the body 22a is molded and adhesively bonded to the reinforcing spring insert band 40a (FIG. 3) employing the usual method of curing by applying heat and pressure, the procedure being well known to those skilled in the art of rubber molding. To supplement the adhesive bond, a mechanical bonding is also obtained by flow of the rubber material of the body 22a around the ends of the insert 40a and through the flowholes 53a and the openings 55a resulting from the piercing operation to form the prongs 54a, thus tying together the outer portion 23a and the inner portion 24a of the elastomeric body 22a, as visualized by reference to FIGS. 2, 3, and 7. As shown in FIGS. 1 and 7, the protector 20a is formed with a tongue-and-groove lateral opening 30a, one side of the opening 30a having three fingers 32a and the other side two fingers 34a, the fingers 32a, 34a being intermeshable so that the pin hole 62a may be axially aligned. The circumference of the inner periphery 26a of the protector 20a is made smaller than the outside circumference of a pipe 15 on which it is to be installed so that the rubber body 22a and the band body 42a must be displaced and deformed to encompass the pipe 15, thus assuring a tight engagement therebetween to preclude slippage.

In FIG. 8, the collar 20a is shown installed or mounted around the pipe 15, and secured in place by means of the latch pin 18 inserted through the axially aligned hole 62a. See also FIG. 1. The installation is accomplished by spreading the opening 30a wide enough to pass the pipe 15 to align the collar 20a therewith, inserting the jaws of a constricting tool (not shown) into the holes 38a to bear against the reinforcing bars 64a to converge the opening 30a and interengage the fingers 32a, 34a until the hole 62a is aligned for insertion of the lockpin 18, as seen in FIGS. 1 and 8. As the rubber body 22a is stretched or dilated to encircle the pipe 15, the inner periphery 26a of the collar 20a is circumjacent to the pipe, and the annular elastomeric portion 24a is substantially confined between the pipe 15 and the band 40a so as to create a hoop tension in the band body 42a. The annular rubber portion 24a, confined between the pipe 15 and the band 40a and being substantially incompressible, is thereby displaced by extrusion or squeezing out of the rubber at the annular ends of the portion 24a, into the relief grooves 28a, and into the flowholes 53a and the pierced openings 55a as the lateral angular portions 48a of the polygonic cylindric body 42a, urged by the hoop tension, tend to move radially inward toward the pipe 15 as the faces 52a are restrained from inward movement by the prongs 54a in contact with the pipe 15, as visualized in FIG. 8. Because of the pliability of the collar 20a with its polygonic cylindric band 40a, adaptability to encrusted, worn, or oversize and undersize pipe is feasible. The lateral radii 50a at the convergence of adjacent faces 52a avoid concentrations of stress in the body 42a and provide freer inward radial movement of the lateral angular portions 48a as the protector 20a is constricted about a pipe 15. A radius 50a of from one thirty-seconds to 1½ inches has been found to be desirable, and such variation may be used further to obtain variations of desired rigidity and adaptability of the band 40a. The substantially uniform circumferential spacing of the lateral polygonal angles 48a and faces 52a about the band 40a tends to assure a uniform hoop tension, distribution of stress, and displacement of the annular elastomeric or rubber portion 24a, thus resulting in a uniformly distributed firm grip on the pipe 15.

The operation of the form of pipe collar 20b exemplified in FIG. 9 and described hereinabove is similar to that described above in reference to collar 20a, the configuration of FIGS. 7 and 8. Collar 20b, however, has the substantially octadecagonal (18'-sided) polygonal cylindrical insert 40b; therefore, having more angles 48b and faces 52b, it is more nearly circularly cylindric initially, so there is less radial inward movement of the angles 48b to approach the radial locus of the faces as the protector 20b is constricted about a pipe 15. Thus it is evident that the degree of adaptability is determined to some extent by the number of lateral angles and faces in the cylindric insert band.

A protector or collar molded as described previously, and having an insert band 40c (Fig. 5) with a polygonal cylindric portion 46c positioned substantially opposite the latch 56c, with two circular cylindrical portions 44c between the portion 46c and the latch 56c, would have a more limited adaptability because of the limited number of lateral angles 48c and faces 52c. It thus provides a means of controlling the degree of dilation by limiting the extent of the expansile polygonic portion 46c.

A protector or collar molded as described previously, and having an insert band 40d (FIGS. 6 and 6a) with two polygonal cylindric portions 46d positioned substantially 120° from the latch 56d, with three circular cylindrical portions 44d circumferentially spaced therebetween, would have a limited expansibility because of the limited number of lateral angles 48d and faces 52d. It thereby also provides a means of controlling the degree of dilation by circumferential distribution of a limited number of expansile polygonic portions 46d.

While the description hereinabove refers primarily to the use of collars of this invention as applied to drill pipe, they may be applied with similar advantages in other installations in which an encircling collar must be expansible in order to fit and accommodate cylindrical surfaces, the outside perimeters of which are not always constant.

Additionally, while the preferred embodiment of the invention has been shown and described as in the form embodied in FIGS. 7 and 8 having the expansible cylindric spring band of FIG. 3 with substantially nine sides, and the embodiment of FIG. 9 having the expansible cylindric spring band of FIG. 4 with substantially 18 sides, as well as those having a polygonal cylindric portion spaced from the latch by two circular cylindric portions (FIG. 5), and those having two polygonal cylindric portions spaced from the latch by three circular cylindric portions (FIGS. 6 and 6a), other combinations and forms with expansible polygonic bands involving minor changes from those described and shown could be made without departing from this invention.

I claim:

1. A pipe collar adapted to encompass a pipe for securement thereon, including:
   a. a substantially cylindrical body comprising elastomeric material and having a lateral opening therein;
   b. a spring band substantially coextensive with said body and embedded therein, with a continuous layer of said elastomeric material disposed between said band and the inner peripheral portion of said body;
   c. said band having latch means for locking said collar under tension about a pipe; and
   d. said band having longitudinal flat sides defining substantially a polygonic cylindric portion, the portions of said band intermediate said sides being deformable by radial inward movement so as to extend said band when said collar is stretched for securement about a pipe.

2. A pipe collar as defined in claim 1 wherein said portions of said band intermediate said sides are radially curved.

3. A pipe collar as defined in claim 2 wherein said portions of said band intermediate said sides have a radial curvature of from one thirty-second to 1½ inches.

4. A pipe collar as defined in claim 1 including: prongs projecting radially inward from said flat sides and adapted to space said sides radially outward from the pipe.

5. A pipe collar as defined in claim 1 wherein: said polygonic cylindric portion of said spring band comprises substantially the circumferential extent of said band.

6. A pipe collar as defined in claim 1 wherein: said polygonic cylindric portion of said spring band comprises more than half of the circumferential extent of said band.

7. A pipe collar as defined in claim 1 wherein: said polygonic cylindric portion of said spring band comprises less than half of the circumferential extent of said spring band.

8. A pipe collar as defined in claim 1 including: a plurality of said polygonic cylindric portions of said spring band, and longitudinally coextensive circular cylindric portions therebetween.

9. A pipe collar as defined in claim 1 wherein: said spring band has holes therethrough for displacement of a portion of said layer of elastomeric material as said portions of said band intermediate the sides move radially inwardly.

10. A pipe collar as defined in claim 1 wherein said layer of elastomeric material has relief grooves formed in said inner peripheral portion.

11. A pipe collar as defined in claim 1 wherein said elastomeric material of the body includes end portions covering the opposite longitudinal ends of said band.